May 28, 1935.   H. E. SMITH ET AL   2,002,802
APPARATUS FOR CONDITIONING AIR
Filed Feb. 16, 1932   3 Sheets-Sheet 1
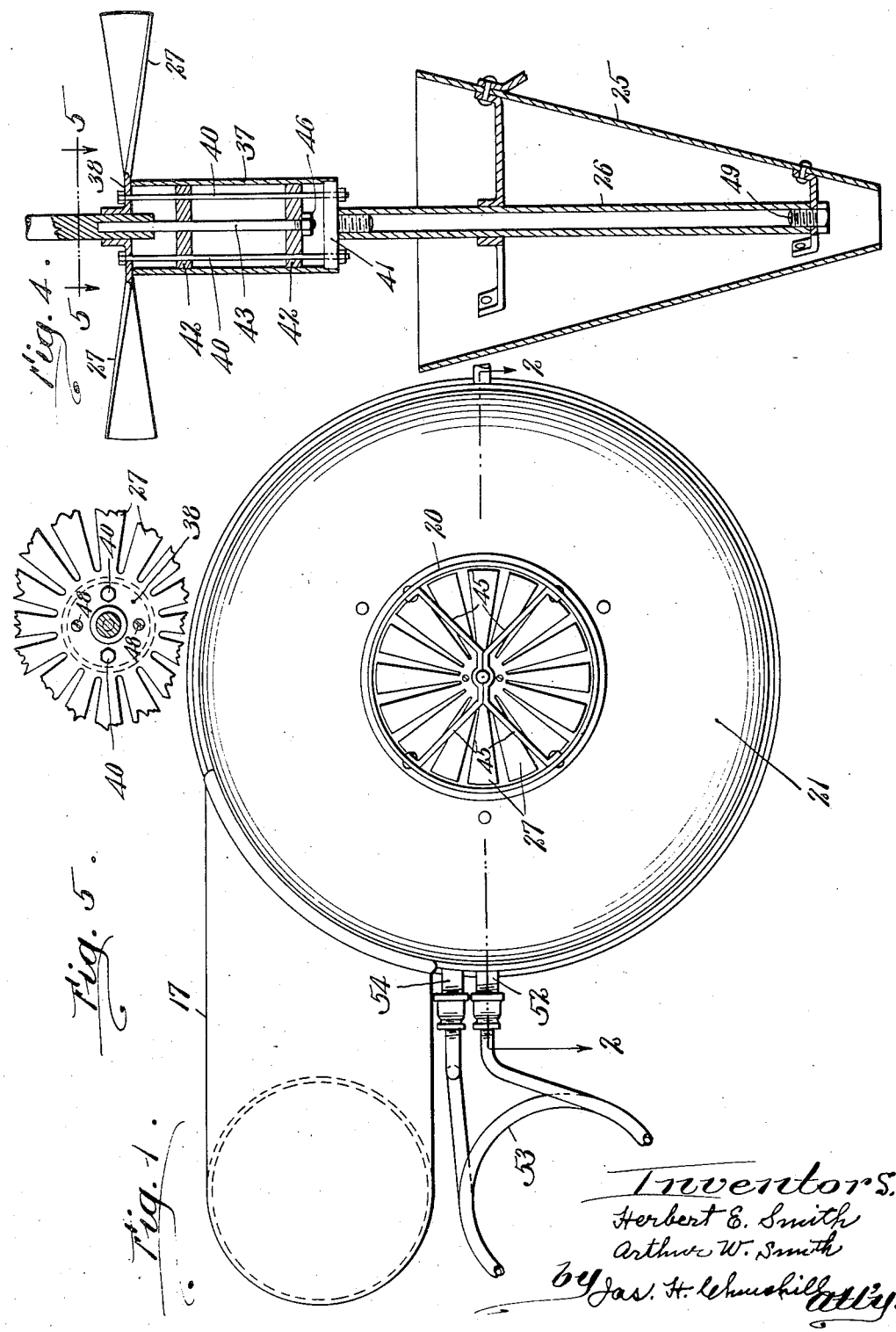

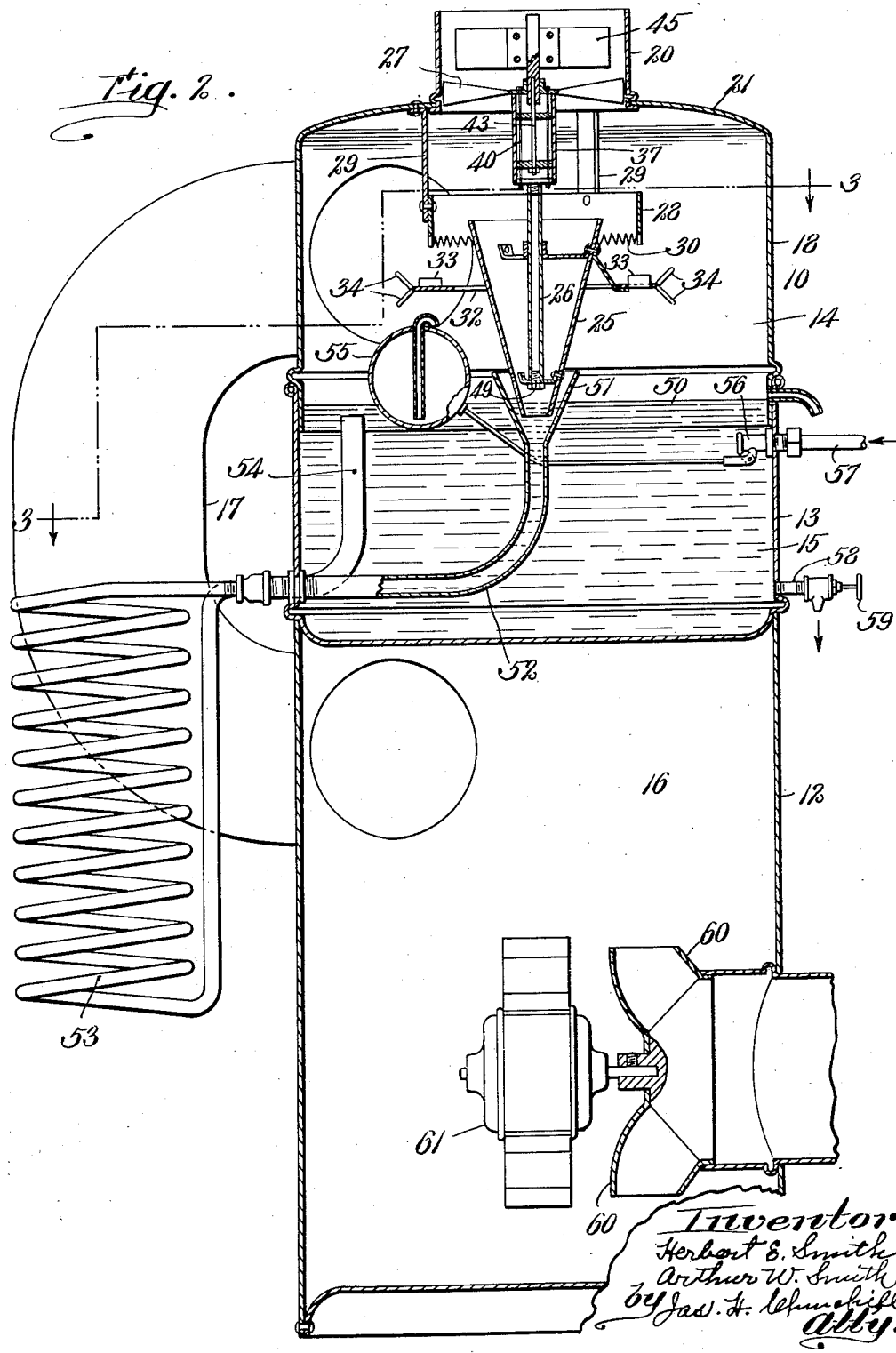

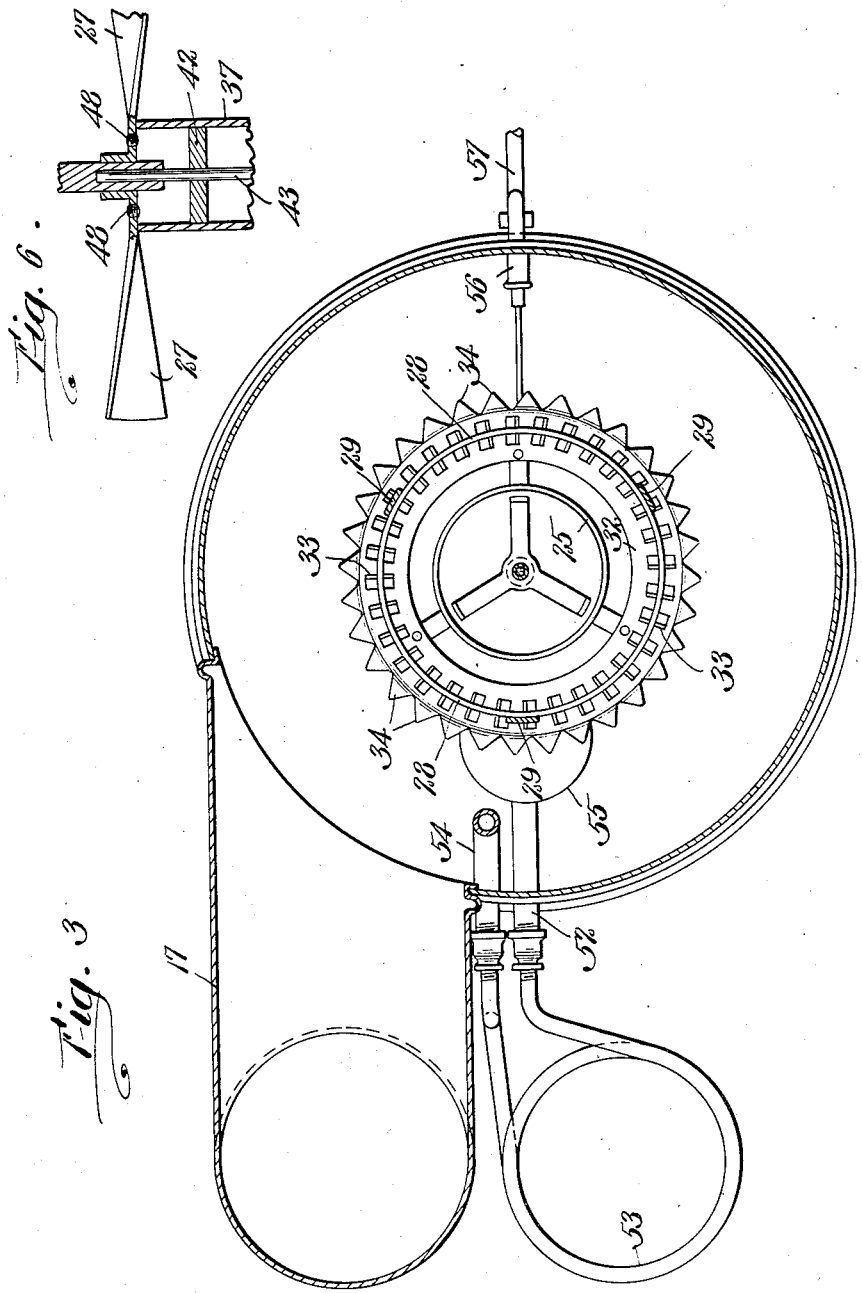

Patented May 28, 1935

2,002,802

UNITED STATES PATENT OFFICE 2,002,802

APPARATUS FOR CONDITIONING AIR

Herbert E. Smith and Arthur W. Smith, Gloucester, Mass.

Application February 16, 1932, Serial No. 593,214

10 Claims. (Cl. 261—79)

This invention relates to apparatus for humidifying and otherwise conditioning air for use in dwelling houses and other structures.

The invention has for its object to effect the humidification, washing and purification of the air by means of the air itself as will be described.

To this end the air has imparted to it a rotary motion, which is utilized to properly humidify and wash the air and also to purify the same from dust, dirt and other foreign matter, which may be present in the air.

The invention also has for its object to provide a simple and highly efficient apparatus for conditioning air in accordance with the operation referred to, and one which is capable of being used for long periods of time with minimum attention and without liability of becoming inoperative as will be described.

These and other features of this invention will be pointed out in the claims at the end of this specification.

Fig. 1 is a plan of an apparatus embodying the invention;

Fig. 2, a vertical section on the line 2—2, Fig. 1;

Fig. 3, a transverse section on the line 3—3, Fig. 2;

Fig. 4, a vertical section on a larger scale of the rotary pump shown in Fig. 2;

Fig. 5, a section on the line 5—5, Fig. 4, and

Fig. 6, a detail of the windmill shown in Figs. 2 and 4.

In the present instance is shown a preferred construction of apparatus with which air may be conditioned in accordance with the operation thereof.

The apparatus herein shown is provided with an upper casing 10, a lower casing 12, and an intermediate casing 13.

The upper casing 10 forms the humidifying chamber 14 of the apparatus, the intermediate casing 13 forms the water supply chamber 15, and the lowest casing 12 forms the air supply chamber 16.

The humidifying chamber 14 is supplied with air from the chamber 16 through a pipe 17 which constitutes the air inlet pipe for the humidifying chamber 14, and said pipe is arranged with relation to the chamber 14 so as to impart a rotary motion to the air admitted into the chamber 14, and thereby produce within the humidifying chamber a stream or current of air having a circular motion. To this end, the air inlet pipe 17 is eccentrically and preferably tangentially arranged with relation to the humidifying chamber 14, as represented in Figs. 1, 2 and 3.

The rotating body of air thus produced within the humidifying chamber 14, has admixed with it a liquid, preferably water, which not only humidifies the air but also washes it and removes dust and dirt therefrom, as will be described.

The humidified air passes out of the humidifying chamber 14 through an outlet pipe 20, which leads to the room or other space in the house or other structure, not shown, into which it is desired to discharge the conditioned air.

In the present instance, the outlet pipe 20 is axially arranged with relation to the humidifying chamber 14, and communicates therewith through a suitable opening in the top wall 21 of said chamber.

The humidifying chamber 14 contains within it apparatus for putting water into a finely divided condition or spray, which apparatus is preferably constructed so as to eliminate the use of parts which are liable to be clogged up by dirt and other particles in the water, and thereby render the apparatus inoperative or substantially so, until cleaned.

The apparatus referred to is preferably made as herein shown, and consists essentially of one form of centrifugal pump, and means for converting the water discharged by the pump into the form of a fine spray.

The centrifugal pump herein shown consists of a substantially conical or frustum-shaped rotor 25, axially arranged within the humidifying chamber 14 with its end of larger diameter uppermost.

The rotor 25 is hollow and is mounted upon a shaft 26 (see Figs. 2 and 4) which may and preferably will be driven by a windmill 27 located in the outlet pipe 20 and rotated by the current of humidified air passing through said outlet pipe.

The water to be sprayed passes up on the inside of the rotor 25 from the narrower inlet end to the wider outlet end, and as it flows over the wider upper end is thrown off therefrom against the inside of a vertically arranged baffle ring 28, which is suspended from the top wall 21 of the humidifying chamber 14 by hangers 29. The upper end of the rotor 25 extends into the baffle ring 28, which is of larger diameter to enable the water thrown off by the rotor, to be shocked and broken up more or less by the impact of the water against the baffle ring. More or less of the water is thus converted into a sufficiently fine condition to form a spray which admixes with the rapidly moving body of air within the humidifying chamber 14.

Any water which is not sprayed by the baffle ring 28 flows down on the same and is preferably gathered into drops by teeth or projections 30 on the lower edge of the baffle ring. To spray any such drops of water, provision is made for subjecting them to a blow after they have dropped off of the baffle ring 28.

To this end, a striker or hammer is provided, which is carried by and revolves with the rotor or pump 25.

One form of hammer is shown, which consists of a metal ring 32 having extended upwardly therefrom a plurality of projections 33 (see Figs. 2 and 3), which may be struck up from the ring 32 and which are arranged below and in line with the baffle ring 28, so that as the drops of water fall from the baffle ring 28, they will be struck by the revolving hammers 33 and more or less converted into a spray. Any water which is not converted into spray by the hammers 33, will be thrown off of the revolving hammer ring 32 and projected against the circular wall 18 of the humidifying chamber.

It is preferred to provide the hammer ring 32 with teeth 34 at its circumference and to have alternate teeth incline up and down as indicated in Fig. 2, so as to gather the water on the revolving hammer ring on the said teeth and facilitate the projection of the water against the wall 18 of the humidifying chamber 14.

It will thus be seen that the water which is used to humidify the air in the humidifying chamber is converted into a finely divided condition or spray by a series of shocks or blows, and any water which is not so divided is returned to the water supply in the chamber 15.

The rotor 25 may and preferably will be rotated by the humidified air passing out of the humidifying chamber through the outlet pipe 20.

To this end the rotor 25 is fast on the shaft 26 which has at its upper end a cylinder 37, which is closed at its upper end by the hub 38 of the windmill 27, which hub is connected by suitable bolts 40 with the head 41 at the lower end of the cylinder (see Fig. 4). The cylinder 37 is provided with bearing disks 42 mounted to rotate on a stationary shaft 43 having an enlarged upper end which is clamped between the members 45 of a cross head or stationary support within the outlet pipe 20 to which said cross head is fastened. The shaft 43 is provided at its lower end with a thrust bearing 46 upon which the lower bearing disk 42 revolves. The cylinder 37 is designed to be filled with oil, which may be supplied through suitable openings in the upper head 38 of the cylinder, which openings are normally closed by screw plugs 48 (see Fig. 5). The rotor 25 is secured to the shaft 26 by a bolt 49 (see Figs. 2 and 4).

In order to vaporize the spray in the humidifying chamber heat is required, which may be supplied by heating the air or as herein shown by heating the water supplied to the pump. To this end the hollow rotor 25 has its open lower end extended below the water line 50 in the water supply chamber 15, and preferably into a funnel or small vessel 51 attached to the upper end of a pipe 52 forming part of a circulating system for heating the water which is fed to the rotor or pump 25.

The pipe 52 is extended outside of the supply chamber 15 and may be connected to one end of a heating coil 53, the other end of which is connected with a pipe 54 within the chamber 15. The pipe 54 has its upper end below the water line 50 and the funnel 51 extends above the water line, so that when the apparatus is in operation, relatively cold water from the supply chamber 15 is circulated through the heating coil 53 and up into the funnel 51, from which heated water is taken by the rotary pump and discharged into the humidifying chamber.

The heating coil 53 may be indirectly heated by a body of heated water in which the said coil is immersed in a manner well understood, but if desired the heating coil may be directly heated, as by a gas burner, not shown, or in any other suitable manner.

The funnel 51 extends above the water line in the supply chamber 15, and as soon as the pump is stopped, circulation of water through the heating coil 53 ceases, and as a result there is no hot water in the tank to produce vapor when the apparatus is not in operation.

It will be observed that no water is heated except that discharged by the pump, and that heated water is supplied to the pump substantially in an instant.

The heated water discharged by the pump is cooled by evaporation and by contact with the circulating air in the humidifying chamber and any unevaporated water falls back into the water supply chamber relatively cool.

In this manner the relatively large body of water in the supply chamber is maintained relatively cold, and evaporation at the surface of this relatively large body of cold water is avoided, or at least reduced to a minimum, and as a result when the pump is not in operation, vapor is not produced in the supply chamber by surface evaporation of the relatively large body of water therein, and consequently vapor from such source is not carried by gravity air circulation into the room or space to be humidified.

The water in the supply tank 15 is maintained at a substantially constant level when the apparatus is in operation by means of a float 55 which controls a valve 56 in the water inlet pipe 57 for the chamber 15, in a manner well understood.

The water supply tank or chamber 15 is in open communication with the humidifying chamber 14 and also serves as a settling chamber for the dirt, dust and other foreign matter which is washed out of the air in the humidifying chamber and separated therefrom by centrifugal action produced by the rotating body of air within the humidifying chamber with which the water is admixed by the pump or rotor 25. The dirt, sediment, etc. washed out of the rotating air stream or current settles to the bottom of the water supply chamber 15 and may be drawn off therefrom through an outlet pipe 58 provided with a valve 59.

The air to be humidified may be supplied under pressure to the humidifying chamber 14 by a fan 60 located in the chamber 16, which fan is driven by an electric motor 61, which may be manually controlled or it may be started and stopped automatically by a regulator of known construction and not herein shown, but which responds to the amount of humidity in the air circulated through the house and the humidifying apparatus.

The operation of the humidifying apparatus may be briefly described as follows:

Assuming the apparatus to be in operation, air is drawn from the room or space to be humidified into the chamber 16 by the fan 60 and is forced therefrom through the pipe 17 into the humidifying chamber 14, wherein the air has imparted to it a rotary motion and is forced out of the humidifying chamber through the outlet pipe 20 back into the room to be humidified. The air forced through the outlet pipe 20 rotates the windmill 27 and thereby rotates the pump or rotor 25, which projects the water or other humidifying liquid into the rotating body or stream of air and subjects the water to the action of the spraying apparatus within the humidifying chamber. The water thus admixed with the rotating body of air, is in both a vaporized and an unvaporized condition, that is, the vaporized water is in the desired condition of particle size to properly humidify the air, and the unvaporized water is in a condition of particle size to properly wash and purify the air. The water of larger particle size is admixed with the rotating body of air, but is removed therefrom by the centrifugal action of the rotating body of air as is also any dirt, dust, or other foreign matter which may be in the air.

It will thus be seen, that the rotating body of air in the humidifying chamber is not only humidified in the proper or desired manner by water in the desired state of fineness or particle size, which may be designated as vapor, but is also washed and purified from dirt, dust, and other foreign matter, and also free from water in the form of larger particle size, which may be designated unvaporized water. As a result, the air supplied to the house is humidified by vapor and is purified from dirt, dust, and the like, and unvaporized water in the air, with its attendant disadvantages, is avoided.

The apparatus herein shown and described, is especially designed for use in dwelling houses and like structures, wherein it is desirable that the apparatus should operate efficiently with the least possible attention and with the least possible noise.

For this reason, it is preferred to employ the rotary pump shown, which has its inlet end extended into a small volume of water in the funnel-shaped outlet 51 of the water-heating system, as the water inlet to the pump can be made of ample size to avoid being clogged up by dirt and sediment in the water, thereby avoiding interruptions in the operations of the pump and therefore of the apparatus.

Driving the pump 25 by the windmill operated by the current of humidified air, enables the fan 60 and its electric motor 61 to be located in the chamber 16, which prevents the noise of the electric motor and fan from being carried up into the house, and enables a motor of ordinary construction to be employed.

The apparatus for vaporizing the water in the humidifying chamber is simple, effective and free from parts requiring manual operation and from parts which are liable to be clogged up.

From the above description, it will be seen that the air which is to be humidified has imparted to it a rotary motion and while rotating has admixed with it water to humidify the air, and that such portion of the water as is not vaporized for properly humidifying the air is caused to wash the air by the rotation of the air and is removed therefrom together with foreign particles contained in the air, thereby not only properly humidifying the air but also purifying it and placing it in a condition of maximum hygienic efficiency for use in dwelling houses and like structures.

While it may be preferred to employ the apparatus herein shown for humidifying air in accordance with the improved method above described, it is not desired to limit the invention to the particular construction of apparatus herein shown, as the improved method may be practised with other constructions of apparatus than that herein shown and described.

What is claimed is:

1. In an apparatus for conditioning air, in combination, a humidifying chamber provided with an air inlet and with an air outlet, said air inlet being eccentrically arranged to impart a rotary motion to the air admitted into said chamber, a centrifugally operating pump within said chamber for admixing water with the rotating body of air, and a windmill in said air outlet for operating said centrifugal pump.

2. In an apparatus for conditioning air, in combination, a humidifying chamber provided with an air inlet and with an air outlet, said air inlet being eccentrically arranged to impart a rotary motion to the air admitted into said chamber, a conical rotor for supplying water to the rotating body of air in said humidifying chamber, a water supply tank communicating with said humidifying chamber, a water-heating system having water inlet and outlet pipes communicating with the water supply tank, and having the water outlet pipe of said heating system provided with an enlarged mouth into which the conical rotor is extended to receive water from said outlet pipe.

3. In an apparatus for conditioning air, in combination, a humidifying chamber provided with an air inlet and with an air outlet, said air inlet being eccentrically arranged to impart a rotary motion to the air admitted into said chamber, a conical rotor for supplying water to the rotating body of air in said humidifying chamber, a water supply tank communicating with said humidifying chamber, a water heating system having water inlet and outlet pipes communicating with the water supply tank and having the water outlet pipe of said heating system co-operating with the conical rotor to supply heated water thereto.

4. In an apparatus for conditioning air, in combination, a humidifying chamber, a water supply chamber upon which the humidifying chamber is supported and sealed by the water in said supply chamber, and an air chamber upon which said water supply chamber is supported, a pipe eccentrically connecting said air chamber with said humidifying chamber to impart rotary motion to the air admitted into said humidifying chamber, a motor-driven fan in said air chamber for forcing air from said air chamber through said pipe into and out of said humidifying chamber, means within the humidifying chamber for pumping water from the water supply chamber into the humidifying chamber, and means for spraying said water and admixing it with the rotating body of air in said humidifying chamber.

5. In an apparatus for conditioning air, in combination, a tank for containing humidifying liquid, a humidifying chamber in open communication with said tank, means for heating the humidifying liquid, said means communicating at one end with said tank to receive liquid therefrom and at its other end with a small vessel within the tank, said vessel having its upper end above the level of the liquid in said tank, and a pump having its inlet in said vessel to receive liquid therefrom and its outlet discharging into said humidifying chamber.

6. In an apparatus for conditioning air, in combination, a tank for containing water, a humidifying chamber communicating with said tank, a water heater connected with said tank below the water line therein to supply the heater with relatively cool water and connected with an outlet pipe for hot water having its upper end above said water line, and a pump within the humidifying chamber having its inlet communicating directly with said hot water outlet pipe to receive hot water directly therefrom while the pump is in operation and discharge said hot water into said humidifying chamber.

7. In an apparatus for conditioning air, in combination, a tank for containing a body of water having a relatively large surface area, a humidifying chamber in open communication with said tank, a rotary pump in said humidifying chamber, and a water heating system connected with said tank to receive relatively cold water therefrom and with said rotary pump to directly supply the latter with hot water while the pump is in operation and to automatically stop the circulation of water from the tank through said heating system directly to said pump when the latter is not in operation and thereby avoid surface evaporation of the body of water in said tank when the pump is not in operation.

8. In an air conditioning apparatus, in combination, a spray chamber, a fixed annular ring within the said chamber, the lower part of which is provided with points or saw teeth, means for supplying water to said ring in such a manner that drops fall from the said points or teeth, a rapidly revolving annular ring or disk provided with flanges or projections located concentrically with and under said fixed ring so that the said drops falling therefrom impinge on the said flanges or projections.

9. In an air conditioning apparatus, in combination, a water tank, a spray chamber communicating with said tank, means for heating water provided with a flow pipe and a return pipe, a smaller vessel located within but having its walls extending above the surface of the water in said tank but not in liquid communication therewith, suitable connection between said return pipe and said vessel, means for spraying within said chamber supplied with water from said vessel, and suitable communication of said return pipe with the water in said tank near its surface.

10. In an apparatus for conditioning air, in combination, a humidifying chamber, means for imparting rotary motion to air passing into and out of said chamber, a rotary pump for supplying water to said chamber, a baffle ring co-operating with the upper end of said rotary pump to spray water thrown against it by said rotary pump, a hammer ring rotatable with said pump and provided with hammers located below said baffle ring to strike water dropping from the latter, said hammer ring co-operating with the walls of said humidifying chamber to project unvaporized water received onto the hammer ring against the walls of said chamber.

HERBERT E. SMITH.
ARTHUR W. SMITH.